Oct. 17, 1944.  H. BIRCHALL  2,360,391
PRESSURE RESISTANT VESSEL
Filed Dec. 28, 1940   2 Sheets-Sheet 1

INVENTOR
HAROLD BIRCHALL
BY K. P. McElroy
ATTORNEY

Oct. 17, 1944.    H. BIRCHALL    2,360,391
PRESSURE RESISTANT VESSEL
Filed Dec. 28, 1940    2 Sheets-Sheet 2
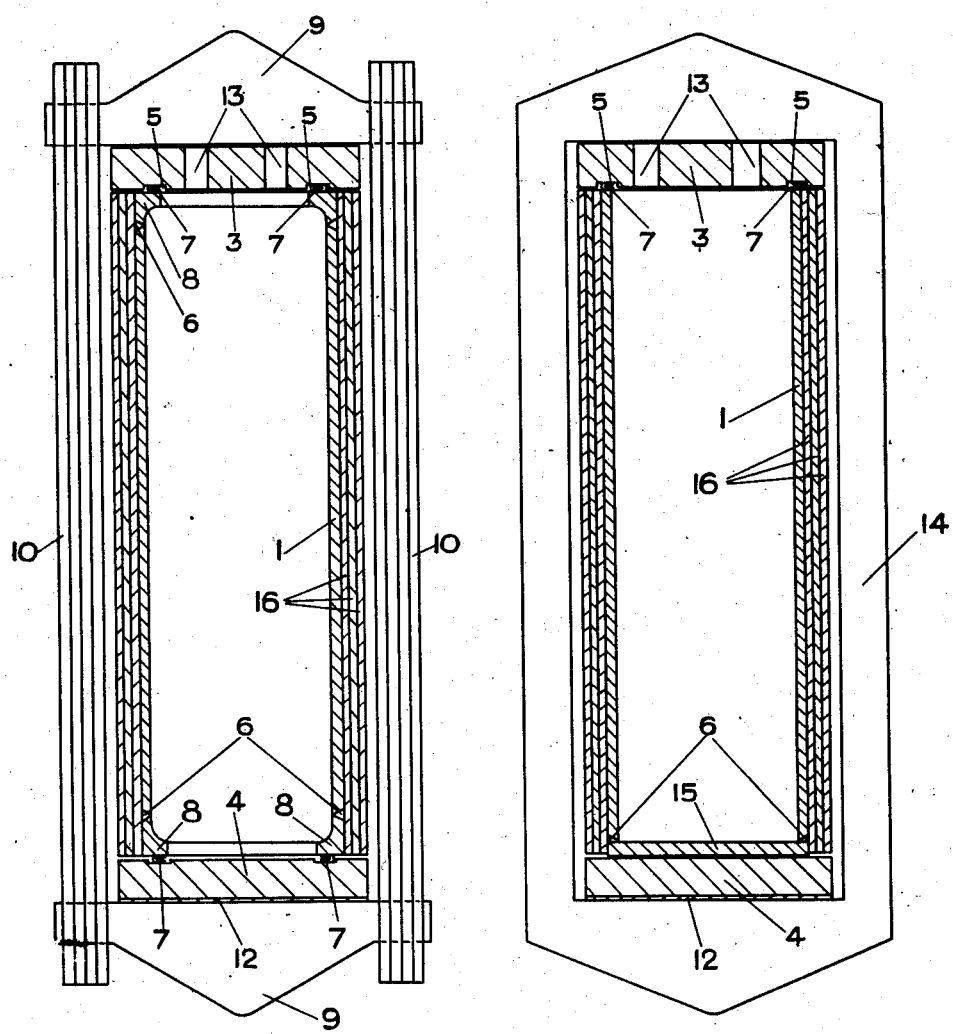
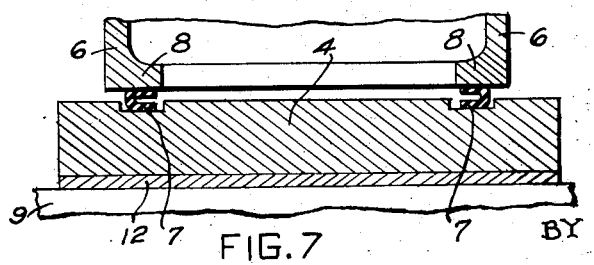
INVENTOR
HAROLD BIRCHALL
BY K. P. McElroy
ATTORNEY Patented Oct. 17, 1944

2,360,391

UNITED STATES PATENT OFFICE 2,360,391

PRESSURE RESISTANT VESSEL

Harold Birchall, Norton-on-Tees, England, assignor to Imperial Chemical Industries Limited, a corporation of Great Britain Application December 28, 1940, Serial No. 372,138
In Great Britain December 28, 1939

9 Claims. (Cl. 220—3)

This invention relates to cylindrical vessels of substantial diameter adapted to withstand high internal fluid pressure, e. g., 50 atmospheres or over, one or both ends being fitted with covers.

Hitherto it has been customary to make such vessels from solid forgings and to attach the covers to the body of the vessel in such a way that its walls not only withstand the hoop stress due to internal fluid pressure, but also the end load exerted on the covers by the internal fluid pressure.

This construction has of necessity been very expensive because of the large amount of metal which has to be rejected from the ingot in order to obtain a sound forging, the difficulties and heavy outlay on plant for forging and heat treating, and also in the case of vessels intended to withstand chemical attack, the high cost of the material of construction. Large forged vessels of this type moreover, which may weigh up to 50 tons, have the disadvantage that they necessitate the installation of heavy lifting gear for their installation and removal for overhaul.

It has also been proposed to build up cylinders of the necessary wall thickness from a nest of concentric tubes, to the ends of which flanges are welded to take the end covers. In this construction, the welds are subjected to the full tensile load on the end covers, and therefore materials must be used in which reliable welds of first class quality can be produced.

The object of the invention is to provide a pressure resistant vessel which has one or more of the following advantages as compared with known pressure resistant vessels.

1. Construction at least in part from metal in readily available and cheap form.
2. Quicker construction.
3. Few or no welds which are subject to heavy tensile load.
4. Smaller lifting gear required for installation and removal.
5. Smaller amount of special alloys to resist internal chemical attack.
6. Smaller stresses at the internal surface of the pressure vessel.

The pressure resistant vessel of this invention comprises a hollow cylinder adapted to withstand the hoop stress due to the said fluid pressure, covers for the ends of the cylinder, and tie-bars external to the cylinder, adapted to relieve the cylinder of tensile load due to internal fluid pressure on the end covers and to hold the covers in fluid-tight contact with the ends of the cylinder.

The hollow cylinder may be a forging, which, however, is lighter and simpler to make than the usual type since it may be in the form of a simple cylinder without the large end flanges hitherto necessary to take the load on the end covers. Moreover, it requires smaller lifting gear for installation and removal since it can be moved independently of the tie-bars.

Alternatively the hollow cylinder may advantageously be built up in the form of an inner tube reinforced to withstand high internal pressure by one or more external elements such as coaxial enveloping tubes. The inner tube may itself be built up from plate or sheet by longitudinal welding, or from plate or sheet wound in the form of a closed helix, with adjacent edges welded together, or from two or more tubes welded end to end circumferentially. If desired the inner tube may consist of two or more tubes placed end to end without any circumferential welds, but with sealing gaskets between adjacent ends.

A feature of the present invention consists in the provision of a particularly advantageous form of built-up hollow cylinder, consisting of an inner tube and a plurality of rings of plate or sheet metal, each concentric with and in contact with the inner tube. By this construction the hollow cylinder can be built up largely or wholly from metal in readily available and cheap forms, i. e., plate or sheet, with little or no welding which will be subjected to heavy tensile loads. Each ring may be in contact with adjacent rings or may be spaced apart from them, the maximum permissible distance between adjacent rings being dependent upon the thickness of the inner tube and the internal pressure to which it is to be subjected.

When employing the built-up construction of cylinder, the reinforcing elements may be shrunk on the inner tube to reduce or even eliminate the hoop stress at its internal surface when in use, so that an inner tube made from sheet or plate metal by longitudinal welding can confidently be used. Moreover, when the vessel is to contain substances which attack the inner tube, the reduction in stress in the inner tube attained by shrinking on the reinforcing members tends to diminish the rate of attack.

The built-up construction of cylinder has the further advantage that the inner tube may be made of different metal from the reinforcing elements. Thus, the latter may be made of a high tensile alloy steel, while the inner tube may be made of metal chosen to resist any chemical attack to which it might be subjected in use, e. g., of an alloy steel resistant to attack by hydrogen at high pressure and elevated temperature.

In a modification the cylinder may be formed with a permanently closed end, e. g., by welding a plate on to it. In this case a cover plate to which the tie-bars are connected preferably bears against the closed end and reinforces it against the internal fluid pressure. It is also possible permanently to seal one end of the cylinder by means of a plate of sufficient strength to withstand the internal fluid pressure, the tie-bars being connected to the said plate.

The external tie-bars may be connected directly to the covers which then are provided with lugs or extend beyond the walls of the cylinder, or may be connected to cross bars which bear against the external face of the covers. The connections between the cross bars and the tie-bars are advantageously solid, that is, the cross bars and tie-bars are integral in the form of a rectangular frame. The cross bars and the tie-bars whether separate or integral may be solid, but they are preferably laminated, that is, built up of a plurality of juxtaposed plates. Thus, in the case of integral tie-bars and cross-bars, they may be built up of a plurality of juxtaposed frames of sheet metal, while in the case of separate tie-bars and cross-bars, the tie-bars may each consist of a plurality of juxtaposed tie plates, and the cross bars may each consist of a plurality of juxtaposed metal plates each of which extends across the cover from one tie-bar to another.

Any suitable known means may be used for sealing the joint between the covers and the cylinder. For example, there may be employed a joint ring of the type which seals by radial pressure against the inner wall of the inner tube, or a joint ring which fits between the cover and the end of the inner tube. When the latter type of joint ring is employed, the ends of the inner tubes are preferably provided with internal flanges to form a suitable seat. These flanges may be welded on to the ends of the inner tube, since they will be subject only to small stresses. When the inner tube is provided with internal flanges, it is preferred to use a sealing ring of C section, so that the fluid pressure acting inside it and towards the other end of the vessel counteracts the fluid pressure acting outwardly on the flange. By suitable choice of the dimensions of the ring, it is possible to balance the pressures on opposite faces of the flange, thereby relieving the inner tube of longitudinal stress.

Alternatively, if desired, the inner tube may be made to carry a part of the longitudinal stress, thereby reducing the end load to be taken by the tie-bars, by providing the inner tube with an internal flange and using a joint ring of smaller diameter than the bore of the inner tube. If desired, the inner tube may be subjected to compressive stress by providing it with an external flange and using a joint ring of greater diameter than the bore of the tube.

In closing the vessel, the initial sealing pressure on the joint between the covers and the cylinder may be conveniently obtained by heating the tie bars, e. g., by means of electrical windings, taking up the slackness thereby produced, for example, when cross bars are used, by inserting packing pieces between them and the covers, and then allowing the cross bars to cool.

Four forms of the invention are illustrated in the accompanying drawings, in which:

Figure 5 is a sectional elevation of a pressure resistant vessel the cylinder of which is provided at its ends with internal flanges which form a seat for sealing rings.

Figure 6 is a sectional elevation of a pressure resistant vessel having one open end, and Figure 7 is a fragmentary and enlarged view of the lower portion of Figure 5.

Figure 1:
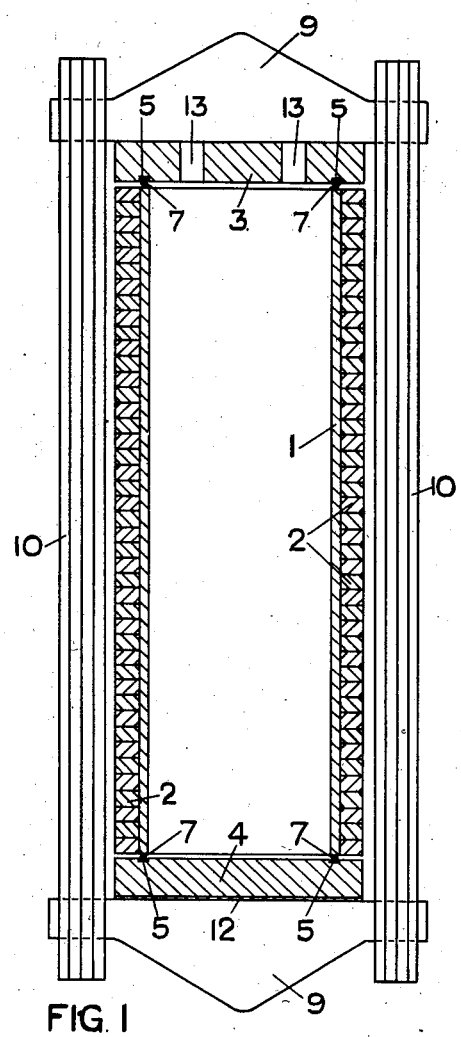
Figure 1 is a sectional elevation of a pressure resistant vessel the covers of which are held in position by means of laminated cross bars and separate laminated tie-bars.
Figure 2:
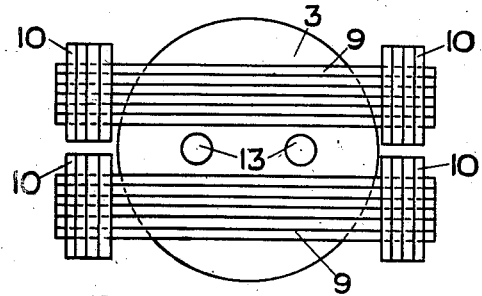
Figure 2 is a plan view of the vessel of Figure 1.

Referring to Figures 1 and 2, the vessel is built up of an inner tube 1 and a plurality of reinforcing rings 2 made from metal plates. It will be apparent that the reinforcing rings are preferably cut in one piece from a sheet of plate material, thus forming continuous annular members having an axial thickness less than their radial width. The covers 3, 4 have annular recesses 5, to accommodate horseshoe sealing rings 7, which bear on the flat ends of the tube 1. The covers are held in position by means of laminated cross-bars 9 the ends of which engage in holes in the ends of laminated tie-bars 10. A shim, indicated at 12, is interposed between the bottom cross bars and the cover 4 when the tie-bars have been expanded by heat, so that a tight joint is obtained when the tie-bars contract. Holes 13 for pipe connections are provided in the cover 3.

Figure 3:
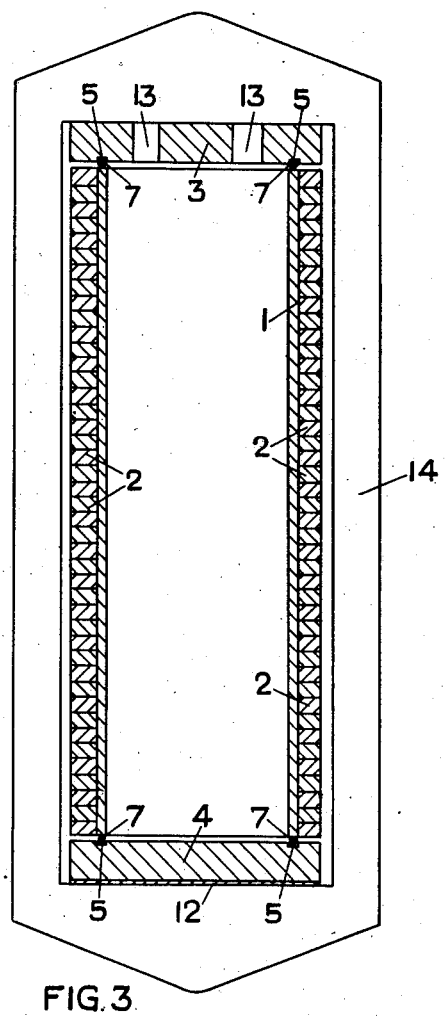
Figure 3 is a sectional elevation of a pressure resistant vessel the covers of which are held in position by means of laminated frames consisting of integral cross bars and tie-bars.
Figure 4:
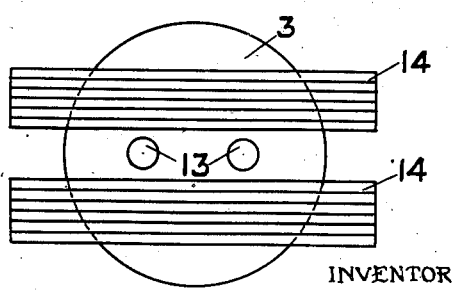
Figure 4 is a plan view of the vessel of Figure 3.

Referring to Figures 3 and 4, the covers are held in position by two laminated frames 14 each consisting of six one-piece plates. The plates are advantageously constructed by cutting from a single plate, or by welding together pairs of end and side members. In other words, the tie bar and cross bar constructions in both of the foregoing embodiments are composed of a plurality of forms cut from plate or sheet material and disposed in flatwise stacked relationship.

Referring to Figure 5, the vessel is built up of an inner tube 1 and a plurality of reinforcing cylinders 16. Internal flanges 8 are connected to the ends of the inner tube 1 by welds 6, and form seats for the sealing rings 7. Figure 7 illustrates this arrangement.

Referring to Figure 6, the vessel is permanently closed at one end by a plate 15, which is welded to the inner tube 1. The cover plate 12 bears against the plate 15 and reinforces it against the internal fluid pressure.

As many widely different embodiments of this invention may be made without departing from the spirit or scope thereof, it is to be understood that the invention is not limited to the specific embodiments thereof, except as defined in the appended claims.

I claim:

1. A vessel resistant to high internal fluid pressure, comprising a tube, a plurality of reinforcing rings of plate metal thinner than the radial width of the rings, mounted in stacked relation, concentric with and in contact with said tube, to brace the tube against hoop stresses due to said fluid pressure, closure means for the ends of the tube, tie bar means external to the tube, extending to adjacent the closure means, and cross bar means secured by said tie bar means and engaging the closure means whereby to press the closure means to the tube against said fluid pressure.

2. A vessel resistant to high internal fluid pressure, comprising a tube, a plurality of mutually touching reinforcing rings of plate metal thinner than the radial width of the rings, concentric with and in contact with said tube and extending from one end thereof to the other, to brace the tube against hoop stresses due to said fluid pressure, closure means for the ends of the tube, and tie bar means external to the tube, extending to adjacent the closure means and engaging the closure means whereby to hold the closure means to the tube against said fluid pressure.

3. A vessel resistant to high internal fluid pressure comprising a tube of a type resistant to hoop stress, end cover means for the tube, and means for retaining the cover means against internal pressure comprising a plurality of frames of plate metal assembled in laminated configuration fitted over the tube and closures, having openings of such length as to engage the cover means and of such width as to clear the tube.

4. A vessel resistant to high internal fluid pressures comprising a tube provided with internal flanges at its ends, a plurality of reinforcing rings of plate metal thinner than the radial width of the rings, concentric with and in contact with said tube, to brace the tube against hoop stresses due to said fluid pressure, closure means for the ends of the tube, annular sealing means between the closure means and the flanges and tie bar means external to the shell, extending to adjacent the closure means and engaging the closure means whereby to hold the closure means against said annular sealing means.

5. A vessel resistant to high internal fluid pressures comprising a tube provided with internal flanges at its ends, a plurality of reinforcing rings of plate metal thinner than the radial width of the rings, concentric with and in contact with said tube, to brace the tube against hoop stresses due to said fluid pressure, closure means for the ends of the tube, annular sealing means between the closure means and the flanges and exposed to pressures in the tube and so proportioned that equal loads are exerted on both faces of each flange by the fluid pressure so that the tube is relieved of longitudinal stress due to fluid pressure; and tie bar means external to the tube, extending to adjacent the closure means and engaging the closure means whereby to hold the closure means against said annular sealing means.

6. A vessel resistant to high internal fluid pressure, comprising a tube, a plurality of reinforcing rings of plate metal of thickness less than the radial width of the rings, concentric with and in contact with the tube, whereby to brace the tube against hoop stresses due to internal fluid pressure, cover means for the ends of the shell and means for retaining the cover means comprising a plurality of frames of plate metal assembled in laminated configuration fitted over the tube and cover means and having openings of such length as to engage the cover means and of such width as to clear the tube.

7. A vessel resistant to high internal fluid pressure and formed substantially entirely from plate material, said vessel comprising a tube, a plurality of reinforcing rings of plate metal thinner than the radial width of the rings and mounted in stacked relation concentric with, and in contact with said tube whereby to brace the tube against hoop stresses due to said fluid pressure, cover means for both ends of the tube and means for retaining said cover means comprising a plurality of frames of plate metal arranged in stacked relationship, each of said frames comprising sections extending across and outwardly beyond the edges of the closure means and a plurality of plate metal sections extending longitudinally adjacent the side of the tube to form laminated tie bars, said tie bar sections being connected with said cross bar sections to resist internal pressure on the closure means.

8. A vessel constructed as defined in claim 7, wherein said tie bar plates are separate from and configurated to engage the extremities of the cross bar sections in operative relation.

9. A vessel resistant to high internal fluid pressure comprising a tubular hollow cylinder of a type resistant to hoop stress, end cover means for the cylinder and means for retaining the cover means against internal fluid pressure comprising a plurality of sheet or plate metal frames relatively thin as compared with their width, said frames being arranged in stacked flatwise relationship and having their upper and lower inner marginal edges adapted to engage the cover means and acting thereon to resist internal fluid pressure on said cover means, and a plurality of continuous annular reinforcing rings of sheet or plate metal, each embracing the cylinder inside of said frames, said reinforcing rings being formed of plate material thinner than the radial width of the rings, and being disposed in flatwise stacked relationship concentric with the cylinder to brace the cylinder against hoop stresses due to fluid pressure.

HAROLD BIRCHALL.